United States Patent [19]

Hashimoto

[11] Patent Number: 5,140,477
[45] Date of Patent: Aug. 18, 1992

[54] MAGNETIC DISK APPARATUS UTILIZING SERVO-SURFACE SERVO

[75] Inventor: Yasuichi Hashimoto, Ohme, Japan

[73] Assignee: Kabushiki Kaisha Toshiba, Kanagawa, Japan

[21] Appl. No.: 632,424

[22] Filed: Dec. 24, 1990

Related U.S. Application Data

[63] Continuation of Ser. No. 209,806, Jun. 22, 1988, abandoned.

[30] Foreign Application Priority Data

Jun. 30, 1987 [JP] Japan ................................ 62-163148

[51] Int. Cl.$^5$ ............................................ G11B 5/596
[52] U.S. Cl. ................................................ 360/77.05
[58] Field of Search ............. 360/65, 67, 77.05, 77.08, 360/77.07, 77.11, 78.04, 78.06

[56] References Cited

U.S. PATENT DOCUMENTS

| 4,396,959 | 8/1983 | Harrison et al. | 360/77.08 |
| 4,636,884 | 1/1987 | Hattori et al. | 360/78.13 |
| 4,724,369 | 2/1988 | Hashimoto | 360/78.14 X |

Primary Examiner—Vincent P. Canney
Assistant Examiner—David L. Robertson
Attorney, Agent, or Firm—Finnegan, Henderson, Farabow, Garrett and Dunner

[57] ABSTRACT

A magnetic disk apparatus designed to obtain data on the position of heads and the rate of movement thereof by extracting the peak values of servo signals corresponding to the positions of a plurality of cylinders set to rotatable disks as analog data on the basis of predetermined timing signals and converting the peak values thus extracted into digital data.

4 Claims, 6 Drawing Sheets

MAGNETIC DISK APPARATUS UTILIZING SERVO-SURFACE SERVO

This application is a continuation, of application Ser. No. 07/209,806, filed June 22, 1988, abandoned.

The present application claims priority of Japanese Patent Application No. 62-163148 filed on June 30, 1987.

FIELD OF THE INVENTION AND RELATED ART STATEMENT

The present invention relates to a magnetic disk apparatus designed to control the movement of heads on the basis of a servo pattern set on a disk.

Heretofore, magnetic disk apparatus have widely been employed as external memory units of a computer system.

FIG. 7 is a diagram showing the construction of a servo control system in a conventional magnetic disk apparatus.

In FIG. 7, disks 1, 1 . . . are concentrically installed one above the other and rotated by a spindle motor 2 at high speed in a predetermined direction. In this case, a servo pattern is pre-recorded on the lowermost undersurface of the disks 1, 1 . . .

A servo head 3 is used to read servo data from the disk, whereas read/write heads 4, 4 . . . are employed to read and write the data to be processed. These heads 3 and 4, 4 . . . all are fitted to a carriage 5. As the carriage 5 moves, the heads 3 and 4, 4 . . . are moved in the radial direction of the disks 1, 1 . . ., so that they are positioned on the respective cylinders.

The carriage 5 is moved along a rail 8 by a voice coil motor consisting of a permanent magnet 6 and a voice coil 7, the amount of movement of the carriage 5 and the rate of movement thereof being controlled by current flowing through the voice coil 7.

On the other hand, the servo data read by the servo-head 3 is supplied via a signal line 9 to a pre-amplifier 10 and amplified therein before being supplied to an AGC (Automatic Gain Control) amplifier 11.

The AGC amplifier 11 amplifies the servo data in order to set the amplitude of the output signal at a predetermined level according to an AGC signal.

A synchronizing signal detecting circuit 12 consists of a voltage comparator and a timing detector, and detects a synchronizing signal from the output signal of the AGC amplifier 11.

A timing signal generating circuit 13 consists of a frequency phase synchronizing circuit (PLL; Phase-Locked Loop), a counter for counting the output of the PLL and a decoder for decoding the output of the counter, and outputting pulses for sampling servo signals.

A sampling/peak-holding circuit 14 samples the servo signals in accordance with the sampling pulses from the timing signal generating circuit 13 and simultaneously holds the respective peak values.

A position signal forming circuit 15 forms head position data signals from the peak values thus held, whereas it creates AGC control signals in such a manner as to make constant the combination of the peak values thus held to control the gain of the AGC amplifier 11.

A data processing circuit 17 calculates the distance from the present head positions up to the respective target cylinders in proportion to the number of cylinders while moving the heads 3 and 4, 4 . . . to the target positions and supplies a predetermined speed value, i.e., data indicating the target speed, which is dependent on the distance, to a target speed signal forming circuit 18.

The target speed signal forming circuit 18 converts the data indicating the target speed into an adequate analog signal and then supplies the analog signal to a driving circuit 19.

The driving circuit 19 supplies current to the voice coil 7 so that the speed detected by and obtained from the speed detecting circuit 16 may become equal to the target speed obtained from the target speed signal forming circuit 18.

In such a conventional magnetic disk apparatus, the servo data read from the disk is processed while the data remains in an analog state to obtain the head position data for the purpose of controlling the movement of the heads.

Since a number of operational amplifiers will be needed to process the servo signal in an analog form, the number of component parts increases.

OBJECT AND SUMMARY OF THE INVENTION

In view of the above problems, an object of the present invention is to provide a magnetic disk apparatus designed to make it possible to change the specification of moving and controlling heads without replacing the component parts and to have the heads satisfactorily followed up even though the rate of movement thereof is increased, with a fewer number of component parts.

In order to accomplish the above object according to the present invention, a magnetic disk apparatus designed to position its heads and control the movement thereof according to servo data corresponding to the positions of a plurality of cylinders set to rotatable disks comprises timing signal forming means for forming timing signals for sampling servo signals obtained by reading out the servo data, peak holding means for extracting the peak values of the servo signals as analog data on the basis of the timing signals and analog-digital converting means for converting the analog data of the peak values into digital data.

In the magnetic disk apparatus according to the present invention, the head position data is obtained by converting the peak values of the servo data obtained by the peak holding means into digital data.

DETAILED DESCRIPTION OF PREFERRED EMBODIMENT

Referring now to the accompanying drawings, a detailed description will be given of a preferred embodiment of the present invention.

Figure 1:
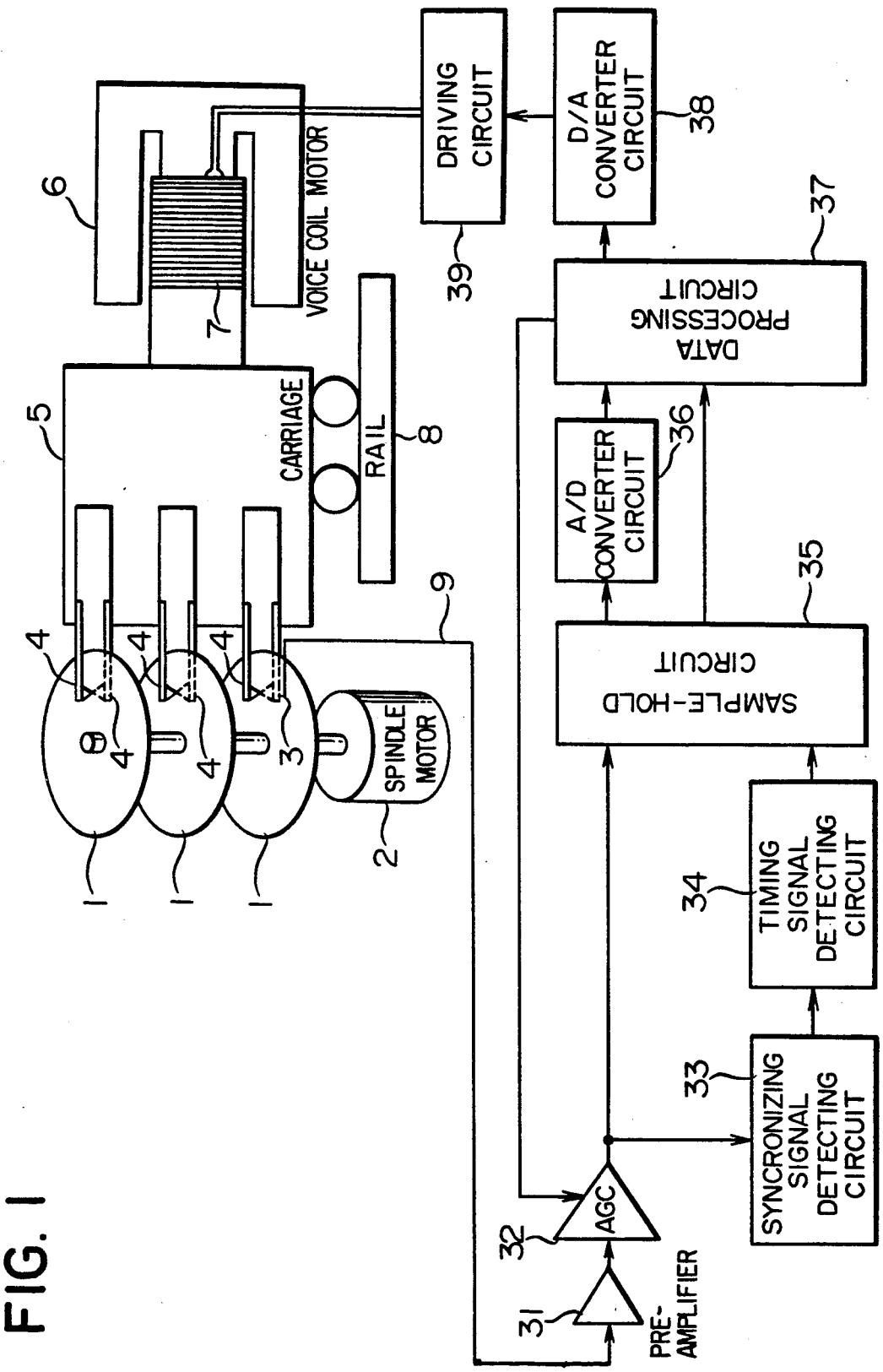
FIG. 1 is a diagram showing the principal part of an embodiment of the present invention.

FIG. 1 is a diagram showing an embodiment of the present invention.

In FIG. 1, disks 1, 1 . . . are concentrically installed one above the other and rotated by a spindle motor 2 in a predetermined direction. In this case, a servo pattern is pre-recorded on the lowermost undersurface of the disks 1, 1 . . .

A servo head 3 is used to read servo data from the disk, whereas read/write heads 4, 4 . . . are employed to read and write the data to be processed. These heads 3 and 4, 4 . . . all are fitted to a carriage 5. As the carriage 5 moves, the heads 3 and 4 4 . . . are moved in the radial direction of the disks 1, 1 . . . , so that they are positioned on the respective cylinders.

The carriage 5 is moved along a rail 8 by a voice coil motor consisting of a permanent magnet 6 and a voice coil 7, the amount of movement of the carriage 5 and the rate of movement thereof being controlled by current flowing through the voice coil 7.

On the other hand, the servo data read by the servo-head 3 is supplied via a signal line 9 to a pre-amplifier 31 and amplified therein before being supplied to an AGC (Automatic Gain Control) amplifier 32.

A syncronizing signal detecting circuit 33 consists of a voltage comparator and a timing detector, and detects a synchronizing signal from the output signal of the AGC amplifier 32.

A timing signal generating circuit 34 consists of a frequency phase synchronizing circuit (PLL; Phase-Locked Loop), a counter for counting the output of the PLL and a decoder for decoding the output of the counter, and outputs sampling-timing signals for sampling servo signals.

A sample-holding circuit 35 samples servo signals according to the aforesaid sampling-timing signals.

An A/D converter circuit 36 converts the servo signals thus sampled into digital data.

On receiving the digital data, a data processing circuit 37 detects head positions.

A D/A converter circuit 38 converts the digital data from the data processing circuit 37 into analog signals.

A driving circuit 39 controls the current flowing through the voice coil 7 according to the analog signals from the D/A converter circuit 38.

Figure 2:
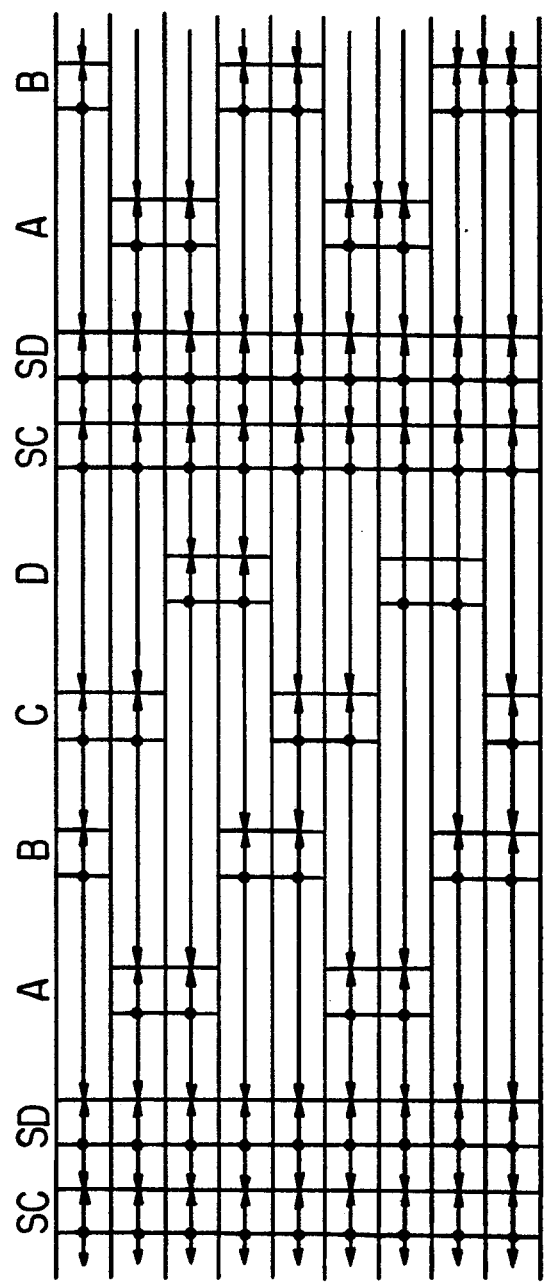
FIG. 2 is a diagram showing a format of servo data in the embodiment thereof.
Figure 2:
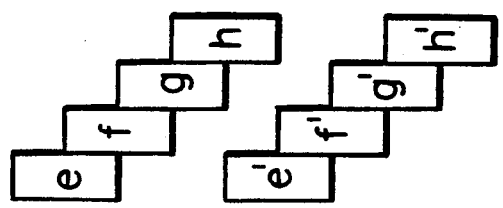

In the magnetic disk apparatus embodying the present invention, the servo data has been recorded on the disks as shown in FIG. 2. The arrows shown in FIG. 2 represent directions of magnetization. The servo data is common to what is employed in the conventional magnetic disk apparatus.

Figure 3:
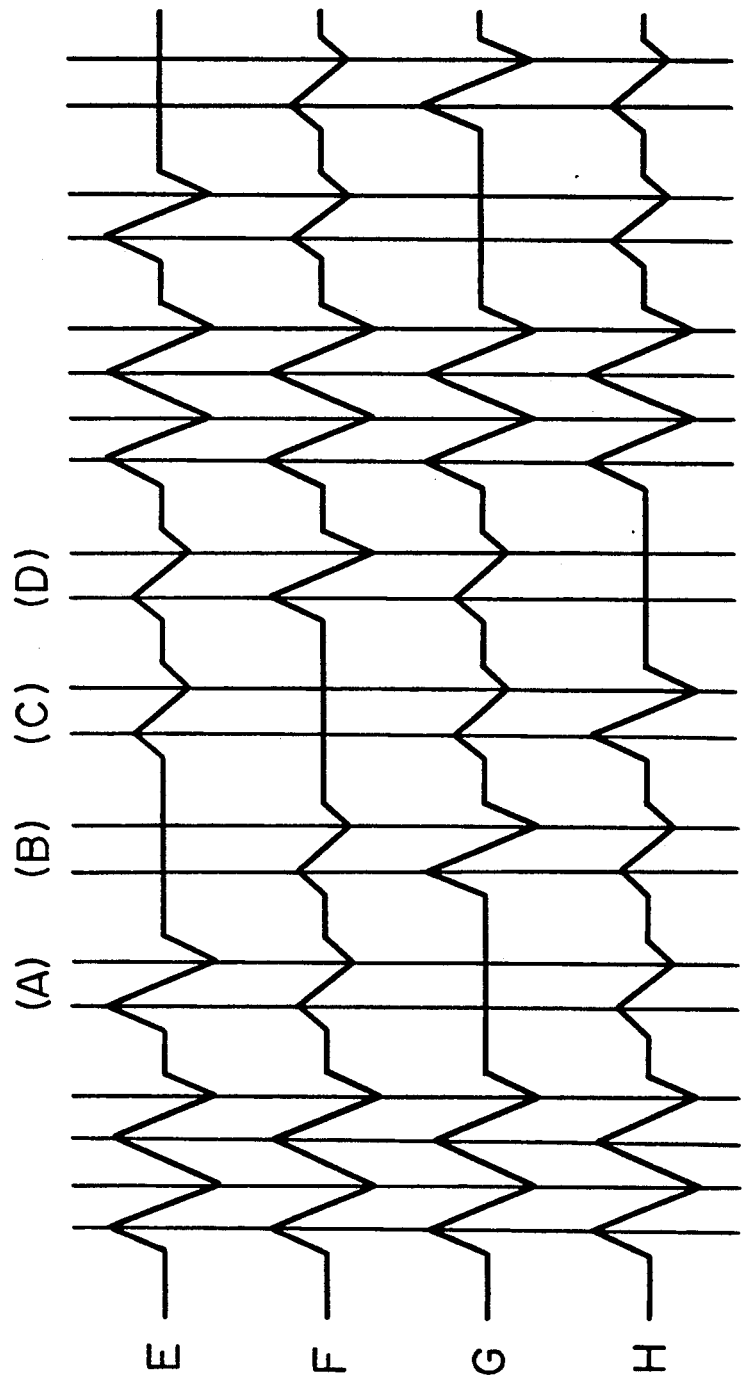
FIG. 3 is a diagram showing waveforms of servo data reading signals (servo signals) in the embodiment thereof.

FIG. 3 is a diagram showing the waveforms of the servo signals obtained by reading out the servo data.

In FIG. 2, the characters e, f, g, h represent the head positions, and in FIG. 3, E, F, G, H the servo signals corresponding to these positions. When the head is located in the position e of FIG. 2, for instance, the servo signal shown by E of FIG. 3 is read by the servo head 3.

The portions indicated by SC, SD in the servo data of FIG. 2 are employed to detect the divisions of the servo data, whereas those designated by A, B, C, D are used to detect the head positions.

When the servo head 3 is located in the position e, for instance, the position data signal (A) has a maximum amplitude. When the servo head 3 is located in the positions f, g and h likewise, the position data signals (D), (B) and (C) have a maximum amplitude, respectively.

In the magnetic disk apparatus according to the present invention, the amplitude values of the position data signals (A), (B), (C), (D) determine whether the heads are moved or set stationary to or at a desired position.

Figure 4:
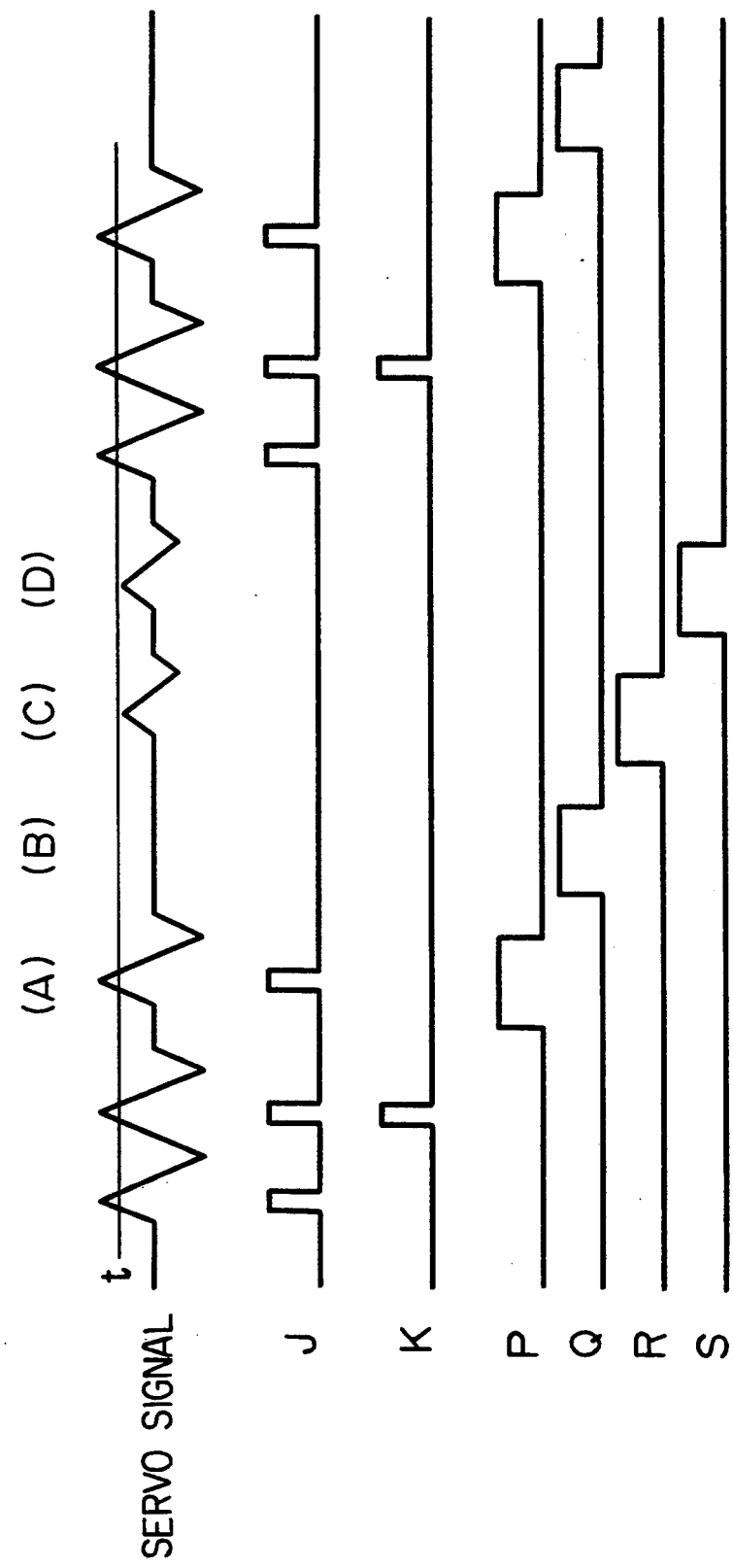
FIG. 4 is a diagram showing the relationship between a servo signal and sampling-timing signals in the embodiment thereof.

FIG. 4 is a diagram showing signals for sampling the position data signals (A), (B), (C), (D).

As shown in FIG. 4, the servo signal applied to the voltage comparator in the synchronizing signal detecting circuit 33 is compared with a preset value t and a signal J produced from the voltage comparator when the servo signal level is greater than the value t.

The timing detector in the synchronizing signal detecting circuit 33 receives the signal J and produces a signal K at the point of time its pulse appears at predetermined intervals. The signal K becomes a synchronizing signal appearing with the period of the servo data and the latter is applied to the timing signal generating circuit 34.

The output of the timing signal detecting circuit 34 becomes signals P, Q, R, S of FIG. 4 respectively used to sample the position data signals (A), (B), (C), (D).

The position data corresponding to the disk position can be obtained by holding the peak value of the output signal of the AGC amplifier 32 using those signals P, Q, R, S.

Figure 5:
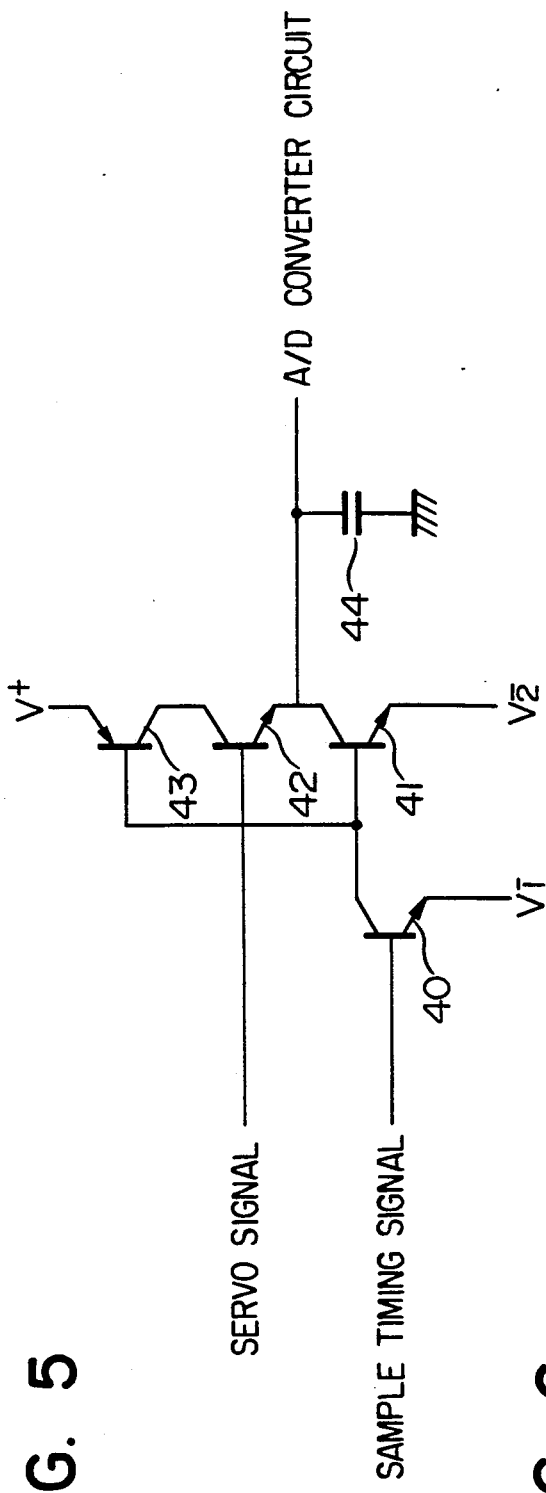
FIG. 5 is a diagram showing a sample-holding circuit configuration in the embodiment thereof.
Figure 6:
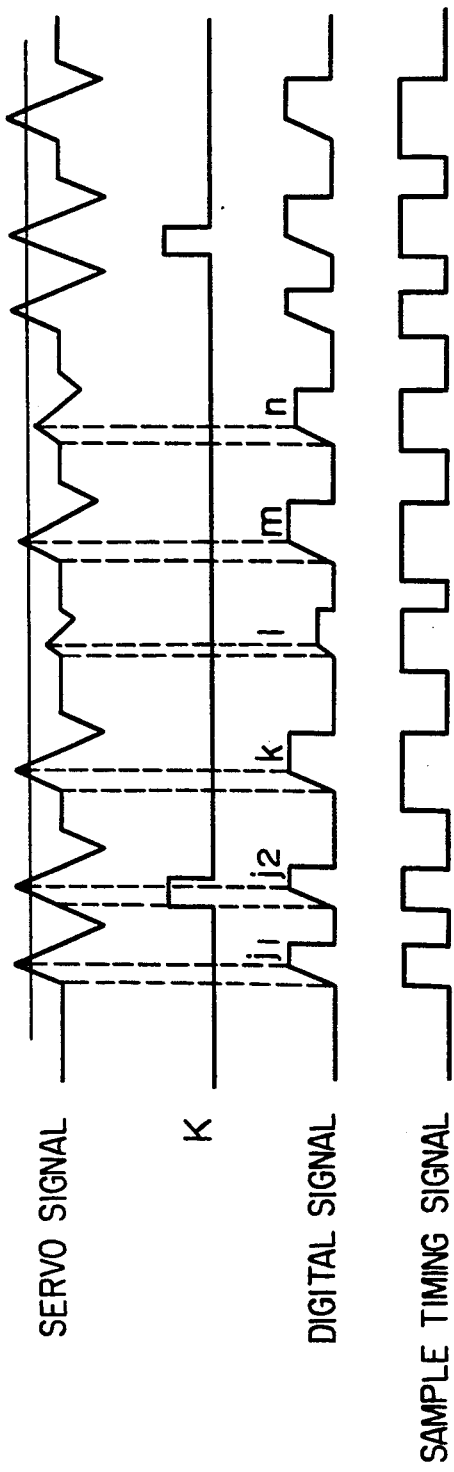
FIG. 6 is a diagram showing a waveform of a digital signal obtained from the servo data in the embodiment thereof.
Figure 7:
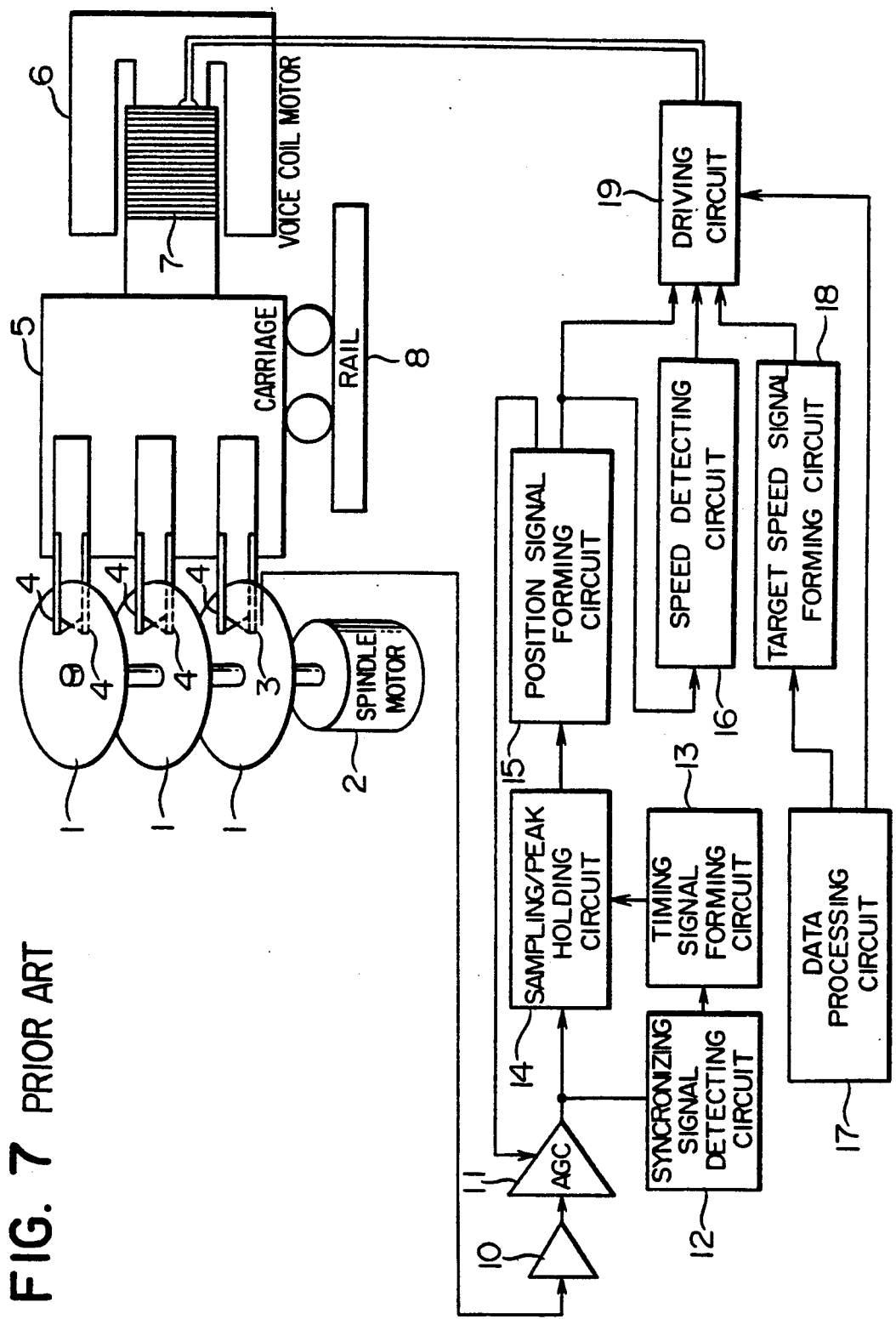
FIG. 7 is a diagram showing a servo control system configuration in a conventional magnetic disk apparatus.

FIG. 5 is a diagram showing the configuration of the sample-hold circuit 35 and FIG. 6, the functions thereof.

The sampling-timing signal from the timing signal detecting circuit 34 is applied to the base of a transistor 40. When the level of the sampling-timing signal becomes HI, the transistor 40 is held on and a transistor 41 is held off, whereas a transistor 43 is held on.

The servo signal, i.e., the output signal of the AGC amplifier 32 is being applied to the base of a transistor 42 then. When the transistor 43 is held on, the current is supplied to a capacitor 44 and the voltage of the servo signal is held in a capacitor 44.

When the level of sampling-timing signal becomes LO then, the transistor 43 is held off and the capacitor 44 cannot be charged because no collector current is supplied to the transistor 42.

When the transistor 41 is held on, on the other hand, the capacitor 44 is caused to discharge and the holding voltage becomes "0".

The voltage of the capacitor 44 is supplied to the A/C converter circuit 36 and converted into a digital value, which is further supplied to the data processing circuit 37.

The sampling-timing signal is also supplied to the data processing circuit 37 so as to instruct digital data transfer timing. In other words, when the level of the sampling-timing signal changes from HI to LO, the data processing circuit 37 reads out the output of the A/D converter circuit 36.

The data processing circuit 37 is thus able to obtain digital signals $J_1$, $J_2$ may be used as AGC signals to make constant the output of the AGC amplifier 32.

In this embodiment, the data processing circuit 37 makes it readily realizable to provide a general microcomputer comprising a binary operational circuit, a logical operational circuit, a program memory, a working temporary memory, a register, etc.

Moreover, speed data corresponding to the rate of movement of the heads can be obtained by equipping the data processing circuit with timing means in order to calculate, using the digital values, the changes of the signals k, l, m and n on a period basis, which appear with a fixed period.

As set forth above, the head position data is made available by converting the servo signals into the digital values in the magnetic disk apparatus according to the present invention. Consequently, it becomes possible to correctively control the heads with defects resulting from coating errors or change data formats only by altering the program intended for the data processing circuit 37. Moreover, the absence of such a position signal forming circuit as composed of a combination of operational amplifiers permits the use of fewer component parts.

Even if the gain of the AGC amplifier is set greater in order to increase the rate of movement of the heads, the other circuits will not be badly affected thereby.

What is claimed is:

1. A magnetic disk apparatus comprising:
    a first disk rotatable about an axis, said first disk having a servo surface in which position data is recorded;
    a second disk rotatable about said axis, said second disk having a data surface in which application data is stored;
    a servo head for reading said position data and for outputting a servo signal;
    timing signal forming means for forming a timing signal from said servo signal;
    peak holding means for extracting the peak values of said servo signal as analog data on the basis of said timing signal;
    analog-digital converting means for converting the analog data of said peak values into digital data; and
    means for forming a continuous position data signal from said digital data, the position data signal indicating the position of said servo head and for providing said position data signal as an output in response to said timing signal.

2. The magnetic disk apparatus of claim 1, wherein said position data signal forming means comprise a data processing circuit.

3. The magnetic disk apparatus of claim 1, further comprising means for forming a speed data signal from said position data signal, said speed data signal indicating a speed of the servo head.

4. The magnetic disk apparatus of claim 3, wherein said position data signal forming means and said speed data signal forming means comprise a data processing circuit.

* * * * *